Figure 1:
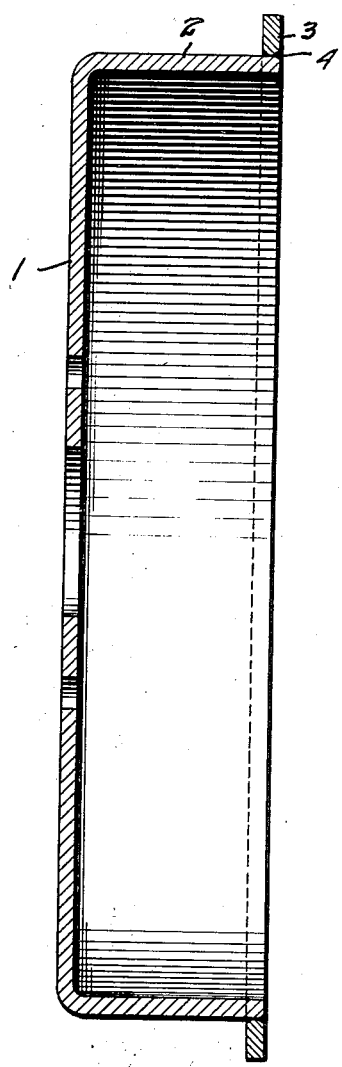

Aug. 30, 1932.　　R. J. NORTON　　1,875,114
BRAKE PART
Filed Aug. 25, 1930

Inventor
Raymond J. Norton
By Semmes & Semmes
and M. W. McConkey
Attorney

Patented Aug. 30, 1932

1,875,114

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE PART

Application filed August 25, 1930. Serial No. 477,674.

This invention relates to brake parts and more particularly to an improved brake drum structure for use on automotive vehicles or airplanes.

There are certain desiderata in brake drum construction. Such brake members should be of sufficient rigidity and strength to successfully withstand the distortive effects of the expansion of the brake shoe and the abrasion of frictional braking. The usual brake drum now employed on automotive vehicles comprises a low carbon deep draw steel. This member is made relatively thin in order to permit the drawing operations.

Since the efficiency of the brake, in a large measure, depends upon the exclusion of water it is usual practice to close off the drum with a closely juxtaposed backing plate. The joint is made by forming the drum with a marginal lip which at the one time serves as a rigidifying flange and as one of the closure elements.

In recent years improvement in brake structure has been in the development of the servo type of brake in which a large retarding force is secured with small power application. When a servo type brake is employed the necessity for a rigid drum increases. Furthermore, as a result of this type of braking, at high speed the frictional heats which are generated may reach a high value. Therefore in order to insure optimum operative characteristics of the drum it is necessary to provide for rapid conduction and dissipation of the generated heat of friction away from the frictional engaging surfaces.

The major purpose of the present invention is to generally improve brake drum structures so as at one time to provide a brake drum of high strength and desirable heat dissipative properties.

Another object is to provide a brake drum characterized by a high heat conductive and dissipative factor.

Yet another object is to provide a brake drum of light weight and high resistance to the distortive effects of frictional braking.

With these and other equally important objects in view the invention includes the provision of a brake drum which is manufactured of a readily formable metal with which is associated an element, or elements which serves at the one time to increase the strength of the drum and thereby resist bell-mouthed expansion and to increase the dissipation of the generated frictional heats.

Figure 2:
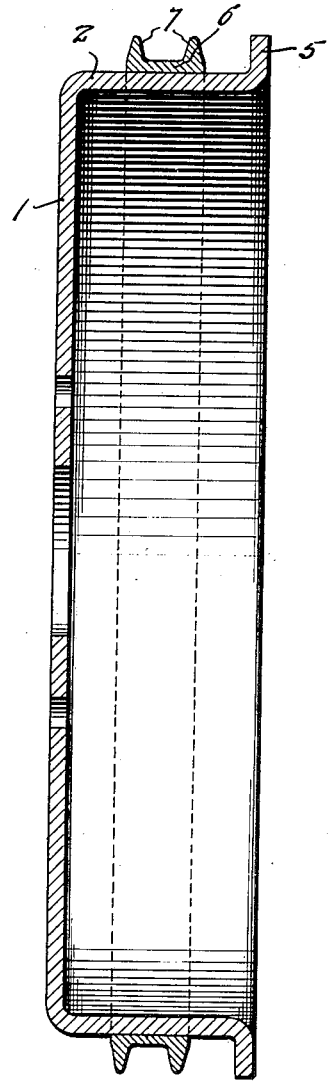

In order to more clearly explain the invention typical physical embodiments are shown in the accompanying drawing in which Figure 1 is a central cross section of one type of drum;

Figure 2 is a similar view of a modified form of the drum.

A method of achieving the objects noted above comprises encircling the braking flange of a pressed steel drum with an annulus of a metal which has a higher thermal conductivity than the metal of the drum and which has a coefficient of expansion approximating that of the drum so that at the one time the annulus serves as a rigidifying member and as a heat conducting path for the generated heats of friction. The accomplishment of these two major advantages presents a wide permissive variation in structure. For example the annulus may be formed about the open end of the drum so as to serve the triple function of a rigidifying flange, a closure member, and a thermal path of high conductivity. Likewise, the annulus may be placed at a middle portion of the drum and formed with heat radiating fins. In this instance the annulus serves its primary function of rigidifying the flange, a second function of providing a heat conductive path and, due to its large surface area, is a rapid dissipator of the conducted heat.

In accordance with the present invention, therefore, a brake drum may be made up which comprises a head 1, formed with an integral braking flange 2. The drum may be made up of a steel stamping. Formed on the open face of the drum is an annulus 3. This metal is preferably one which has a greater heat conductivity than the iron, a tensile strength which is sufficient to subserve the rigidifying function and a coefficient of expansion which is approximately equal to that of iron. Since the annulus 3 projects outwardly of the drum and since it has a large surface area with respect to its total volume the cooling effect on this will be considerable, hence in actual use the metal chosen for the annulus may have a greater coefficient of expansion than the drum. Since its temperature will be lower than that of the drum its total expansion will be less and hence the compressive contact with the drum may be maintained.

As is known, most of the metals which present a high coefficient of thermal conductivity are characterized by a high coefficient of expansion. In accordance with the present invention, however, a special material is employed to accomplish these novel results. The desirable characteristics herein required are presented by a recently developed alloy known to the trade as alloy No. 132. This is an aluminous alloy containing substantially 14% of silicon, varying small amount of magnesium, copper and nickel and the remainder aluminum. This material is characterized by a very high conductivity and a much lower coefficient of expansion than the typical aluminum alloy. The coefficient of expansion of this material is approximately 18% less than that of the usual automotive aluminum alloys and approximately 20% less than aluminum. It closely approximates the expansion of the non-magnetic irons and steels. The member made up of this material may be cast, or otherwise formed around upon the face of the drum, being joined thereto either by a compressive friction joint 4, or by any suitable type of fusion joint. In this form the annulus serves as a highly efficient heat conductive path, as a closure member, and as a rigidifying member for the drum to prevent bell-mouthed expansion.

The invention may take other physical embodiments, such, for example, as is shown in Figure 2. In this form the brake drum, having the head, 1, and braking flange 2, is formed with an integral up-turned marginal lip 5, in the usual manner. Formed on the exterior surface of the drum is an annulus 6, of the metal having the described characteristics. This ring may be of any desired width and preferably is formed with the heat radiating fins 7. If desired, the exterior heat dissipating surface may be so treated as to increase the heat emissivity factor as by subjecting the surface to anodic oxidation.

It will now be appreciated that the drum herein described presents many advantages. It permits of the employment of a low carbon steel with all of the facility of manufacture by this material, while insuring a drum which is sufficiently strong to resist rigorous service. In addition the drum structure is improved by rapidly conducting away the generated heat of friction and thus keeping the drum in a relatively cool condition. These novel results are achieved by a very simple method, which may be practiced with facility. While preferred embodiments have been described therefor, these are given merely by way of examples of the principles herein involved; and since these principles may be incorporated in other specific physical structures it is not intended to be limited to those described except as such limitations are clearly imposed by the appended claims.

I claim:

1. A ferrous brake drum comprising a cylindrical braking flange, an exterior section on the flange of a material having a higher heat conductivity than the metal of the flange and a rate of thermal expansion not substantially greater than that of the flange.

2. A brake mechanism comprising a brake drum including a head and circumferential flange of relatively easily deformable metal and an exterior annular ring of a metal having a higher heat conductivity than the metal of the drum and a rate of thermal expansion not substantially greater than that of the drum, adapted to rigidify the drum.

3. A brake drum comprising pressed steel head and annular part having an enclosing ring of a metal of higher thermal conductivity and a rate of thermal expansion not substantially greater than that of pressed steel.

4. The method of cooling iron brake drums comprising contacting with the surface of the drum an annular member having a higher heat conductivity and heat emissivity than the drum and a rate of thermal expansion not substantially greater than that of the drum.

5. A pressed steel brake drum having an annual exterior ring of a non-ferrous material having a higher heat conductivity than the drum and a rate of thermal expansion not substantially greater than that of the drum.

6. A pressed steel brake drum having a marginal lip of a material having a higher coefficient of conductivity than the body of the drum.

7. A brake drum comprising a steel head and braking flange and a non-ferrous marginal lip.

8. A brake drum comprising a ferruginous brake flange and an exterior ring contacting with and rigidifying the flange; the ring comprising a non-ferrous alloy of high thermal conductivity and a rate of thermal expansion not substantially greater than that of the flange.

9. A brake drum having a pressed steel head and flange and a ring-like member encircling the flange and adapted to rigidify it, the member being characterized by high heat conductivity and emissivity and having a rate of thermal expansion not substantially greater than that of pressed steel.

10. A brake drum of steel having an exterior ring of metal adapted to rigidify the drum and to transmit heat at a faster rate than iron and expanding under thermal changes at a rate not substantially greater than that of the drum.

11. A brake drum comprising a circumferential braking flange, means to check mechanical and thermal distortion of the drum comprising a highly heat conductive and high heat emissive annulus surrounding the drum, said annulus having a rate of thermal expansion not substantially greater than that of the drum.

12. A steel brake drum comprising a head and braking flange, an exterior section on the flange of a material having a higher heat conductivity and heat emissivity than the metal of the flange and a rate of thermal expansion not substantially greater than that of the flange.

13. A brake drum comprising, a steel head and circumferential braking flange, an exterior section on the flange of a material of lower specific gravity, higher heat conductivity and emissivity than steel, said material having a rate of thermal expansion not substantially greater than that of steel.

14. A brake drum comprising a steel head and braking flange, an exterior ring-like member of an aluminous alloy which has a higher heat conductivity and emissivity than steel, and a rate of thermal expansion not substantially greater than that of steel.

In testimony whereof I affix my signature.

RAYMOND J. NORTON.